United States Patent
Foresto et al.

(10) Patent No.: US 10,794,392 B2
(45) Date of Patent: Oct. 6, 2020

(54) HUB FOR PROPELLER HAVING VARIABLE-PITCH BLADES, WITH RADIAL AND AXIAL DIMENSIONING VARIATION

(71) Applicant: SAFRAN AIRCRAFT ENGINES, Paris (FR)

(72) Inventors: Paul Antoine Foresto, Fontainbleau (FR); Vivien Mickaël Courtier, Yerres (FR); Christophe Paul Jacquemard, Hericy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/078,060

(22) PCT Filed: Feb. 20, 2017

(86) PCT No.: PCT/FR2017/050378
§ 371 (c)(1),
(2) Date: Aug. 21, 2018

(87) PCT Pub. No.: WO2017/144807
PCT Pub. Date: Aug. 31, 2017

(65) Prior Publication Data
US 2019/0048888 A1    Feb. 14, 2019

(30) Foreign Application Priority Data

Feb. 25, 2016  (FR) ..................................... 16 51559

(51) Int. Cl.
*F04D 29/32*  (2006.01)
*B64C 11/06*  (2006.01)
(Continued)

(52) U.S. Cl.
CPC ............ *F04D 29/329* (2013.01); *B64C 11/02* (2013.01); *B64C 11/06* (2013.01); *F01D 5/02* (2013.01);
(Continued)

(58) Field of Classification Search
CPC .... F04D 29/329; F04D 29/362; F04D 29/323; B64C 11/02; B64C 11/06; B64C 11/46;
(Continued)

(56) References Cited

U.S. PATENT DOCUMENTS

| | | | |
|---|---|---|---|
| 2004/0042897 | A1 | 3/2004 | Pietricola |
| 2010/0048069 | A1 | 2/2010 | Duncan |

(Continued)

FOREIGN PATENT DOCUMENTS

| | | | |
|---|---|---|---|
| EP | 1 900 636 | A1 | 3/2008 |
| FR | 2 996 592 | A1 | 4/2014 |

(Continued)

OTHER PUBLICATIONS

International Search Report dated Jun. 13, 2017 in PCT/FR2017/050378 filed Feb. 20, 2017.
(Continued)

*Primary Examiner* — Richard A Edgar
*Assistant Examiner* — Michael K. Reitz
(74) *Attorney, Agent, or Firm* — Oblon, McClelland, Maier & Neustadt, L.L.P.

(57) ABSTRACT

A hub for a propeller having variable-pitch blades for a turbomachine with longitudinal rotation axis, including a plurality of blade platforms, each one being designed to receive a blade root, the platforms being distributed around the annular outer periphery of the hub concentrically with the longitudinal rotation axis, wherein each blade platform has the general geometric shape of a spherical cap, and wherein, between two adjacent blade platforms around the (Continued)

longitudinal rotation axis, the transverse dimension, in particular the diameter, of the hub can vary axially and radially.

9 Claims, 3 Drawing Sheets

(51) Int. Cl.

| | | |
|---|---|---|
| *F01D 5/14* | (2006.01) | |
| *B64C 11/02* | (2006.01) | |
| *F01D 5/02* | (2006.01) | |
| *F01D 5/30* | (2006.01) | |
| *F01D 7/00* | (2006.01) | |
| *F04D 29/36* | (2006.01) | |

(52) U.S. Cl.
CPC ............... *F01D 5/143* (2013.01); *F01D 5/30* (2013.01); *F01D 7/00* (2013.01); *F04D 29/323* (2013.01); *F04D 29/362* (2013.01); *F05D 2220/36* (2013.01); *F05D 2250/184* (2013.01); *F05D 2250/713* (2013.01); *F05D 2260/74* (2013.01); *Y02T 50/673* (2013.01)

(58) Field of Classification Search
CPC . F01D 5/02; F01D 5/022; F01D 5/143; F01D 5/30; F01D 7/00; F05D 2220/36
See application file for complete search history.

(56) References Cited

U.S. PATENT DOCUMENTS

| | | | |
|---|---|---|---|
| 2010/0075552 A1 | 3/2010 | Duncan | |
| 2013/0343892 A1 | 12/2013 | Stretton | |
| 2014/0140822 A1* | 5/2014 | Capozzi | ................... F01D 9/00 |
| | | | 415/160 |
| 2015/0176418 A1* | 6/2015 | Marshall | ............... F04D 29/544 |
| | | | 415/1 |
| 2015/0260045 A1 | 9/2015 | Chartier et al. | |
| 2015/0275916 A1* | 10/2015 | Marshall | ............... F01D 17/162 |
| | | | 415/148 |
| 2016/0121999 A1 | 5/2016 | Tajan et al. | |

FOREIGN PATENT DOCUMENTS

| | | |
|---|---|---|
| FR | 3 006 988 A1 | 12/2014 |
| WO | WO 02/055845 A1 | 7/2002 |

OTHER PUBLICATIONS

French Preliminary Search Report dated Nov. 3, 2016 in French Application 1651559 filed Feb. 25, 2016.

* cited by examiner

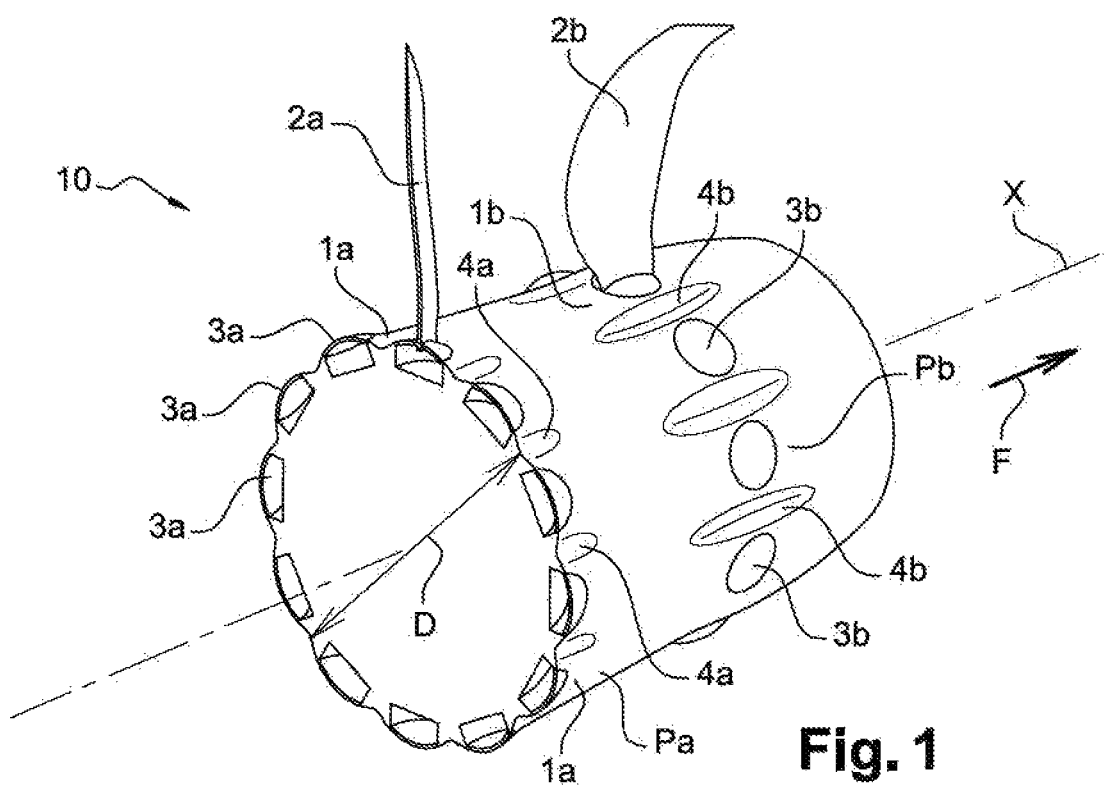
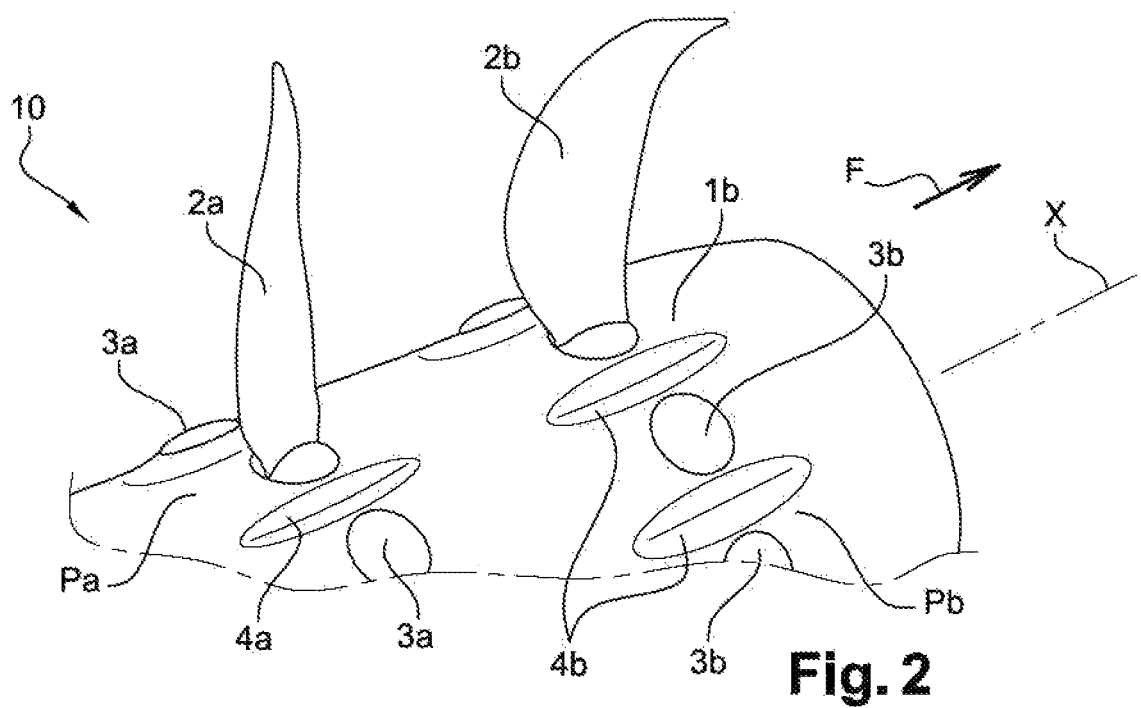

HUB FOR PROPELLER HAVING VARIABLE-PITCH BLADES, WITH RADIAL AND AXIAL DIMENSIONING VARIATION

TECHNICAL FIELD

The present invention relates to the field of turbomachines, and more particularly the general field of variable-pitch turbomachine vanes.

The invention is applicable to any type of terrestrial or aeronautic turbomachines, and in particular to aircraft turbomachines such as turbojet engines and turboprop engines, of the puller or pusher type. In a non-limiting way, the invention is for example applicable to a twin spool turbofan engine, or even an aircraft turbomachine of the "unducted fan" type also called "open rotor" or "propfan" for a couple of unducted counter-rotating or co-rotating propellers, or even called "unducted single fan" (USF) for a single unducted propeller.

The general architecture of a turbomachine of the "unducted fan" type is distinguished from that of a conventional turbomachine by the particular arrangement of the fan outside the turbomachine duct. Two types of unducted fan turbomachines are distinguished, namely those of the pusher ("open rotor pusher") type and those of the puller ("open rotor puller") type. In the case of a pusher type unducted fan turbomachine, the rotating propeller or the co-rotating or counter-rotating propellers are arranged downstream of the turbomachine, that is at the rear of the turbomachine along the direction of travel of the aircraft. In the case of a puller type unducted fan turbomachine, the rotating propeller or the co-rotating or counter-rotating propellers are located upstream of the turbomachine, that is at the front thereof.

The invention thus relates more precisely to a hub for a propeller with variable-pitch blades for a turbomachine with a longitudinal axis of rotation having an axial and radial variation in its transverse dimension, as well as a turbomachine including such a propeller hub.

STATE OF PRIOR ART

In the general field of turbomachines, it is known to use turbomachine vanes including at least one rotor and variable geometrical pitch blades.

A propeller of such a variable-pitch vane includes a plurality of blades rotatably driven by the rotor about the axis of the turbomachine or propeller axis. The geometrical pitch is the angle formed by the chord of the profile of the blade and the plane of rotation of the propeller, defined as the plane orthogonal to the axis of rotation of the vane propeller.

Conventionally, the blades of a propeller are located above the propeller hub, also designated by the term "nave", typically a substantially cylindrical shape. The variable pitch of a propeller blade on such a hub (or nave) with a substantially cylindrical shape requires the presence of a clearance between the hub and the propeller blade. The dimension of this clearance can be variable depending on the pitch. However, for a high quality aerodynamic flow on the blade, this clearance is undesirable.

Various solutions are known, enabling the interface between a propeller blade of the turbomachine and the propeller hub with a substantially cylindrical shape to be managed.

Thus, a connection configuration between the propeller blade and the propeller hub consists in providing no blade platform. Thus, the hub is "open" at the blade and freely communicates with the outer flow to the hub. Thereby, there is a form of geometrical discontinuity of the hub, which brings about flow disturbances at the blade root which are detrimental to the aerodynamic performance of the propeller.

There is also a connection configuration between the propeller blade and the propeller hub which provides for the use of a blade platform. This platform thereby enables the opening at the propeller hub to be "filled" and enables the blade to be mounted. The dimensioning and geometry of this platform are arranged so as to ensure a proper geometrical continuity at a particular pitch, thus for a particular flight point. This flight point is conventionally chosen as the point for which performance optimisation is desired. However, upon varying the pitch, the platform creates a projection with the propeller hub, causing a disruption in the global geometry which originates an efficiency loss for the blades.

Another known connection configuration between the propeller blade and the propeller hub consists in using a blade platform and in providing that the blade is not fully attached to the platform. This is for example possible in the case of a wide chord propeller. Thus, induced disturbances are of two natures, namely on the one hand the projection created by the platform as previously indicated, and on the other hand the existence of a clearance between the blade and the platform for the protruding parts.

Thus, there is a need to provide another connection solution between a variable-pitch blade of the turbomachine propeller and the corresponding propeller hub to limit the existing clearance between the blade and the hub on the entire blade pitch range, while ensuring aerodynamic flow performance at the propeller hub.

From American patent application US 2013/0343892 A1, turbomachine naves having diameter variations along the engine axis are known. More precisely, a nave is described including two diameter variations, one under each rotor of a couple of counter-rotating propellers, forming a ring with a constant diameter. These variations enable the Mach level on the rotors to be decreased and thus shocks on the blades to be decreased. However, this nave type does not enable the clearance which exists between the nave and a variable-pitch blade to be limited on the entire pitch range.

Additionally, French patent application FR 3 006 988 A1 describes a spherical blade pivot which allows a better integration of a variable-pitch blade in the nacelle, and thus enables the clearance between the nave and the blade to be limited. However, the issue of the nave structure and its aerodynamic performance is not taken into consideration.

DISCLOSURE OF THE INVENTION

The purpose of the invention is to overcome at least partially the abovementioned needs and the drawbacks relating to the embodiments of prior art.

One object of the invention is thus, according to one of its aspects, a hub for a propeller with variable-pitch blades for a turbomachine having a longitudinal axis of rotation, including a plurality of blade platforms, each for receiving a blade root, distributed at the outer annular perimeter of the hub in a concentric way to the longitudinal axis of rotation, characterised in that each blade platform has a generally spherical cap geometrical shape, and in that, between two adjacent blade platforms about the longitudinal axis of rotation, the transverse dimension of the hub is axially and radially variable.

The generally spherical cap geometrical shape of each blade platform can in particular be made as described in French patent application FR 3 006 988 A1.

By virtue of the invention, it is possible to ensure a continuous connection between a variable-pitch propeller blade of a turbomachine and the corresponding propeller hub, in particular a geometrical continuity between the blade platform and the propeller hub, on the entire blade pitch range, while ensuring aerodynamic performance of the propeller hub, that is a limited boundary layer separation at the platform, limited airflow disturbances and an increase in the flow cross-sectional area at the blade root when the hub is dug in order to decrease the relative mach on the profiles.

The propeller hub according to the invention can further include one or more of the following characteristics taken alone or according to any technically possible combinations.

The hub can more particularly have, between two adjacent blade platforms about the longitudinal axis of rotation, a geometrical relief shape causing an axial and radial variation in the transverse dimension, in particular in the diameter, of the hub.

The concavity of the generally spherical cap geometrical shape of each blade platform is advantageously reverse to the concavity of the geometrical relief shape of the hub between two adjacent blade platforms about the longitudinal axis of rotation.

According to a first embodiment, the generally spherical cap geometrical shape of each blade platform can be substantially convex with respect to the longitudinal axis of rotation and the geometrical relief shape of the hub between two adjacent blade platforms about the longitudinal axis of rotation can be substantially concave with respect to the longitudinal axis of rotation.

According to a second embodiment, the generally spherical cap geometrical shape of each blade platform can be substantially concave with respect to the longitudinal axis of rotation and the geometrical relief shape of the hub between two adjacent blade platforms about the longitudinal axis of rotation can be substantially convex with respect to the longitudinal axis of rotation.

The geometrical relief shape of the hub between two adjacent blade platforms about the longitudinal axis of rotation can be substantially related to an arc of circle shape in a transverse cross-section.

Additionally, the reverse concavities of the generally spherical cap geometrical shapes of each blade platform and of the geometrical relief shapes of the hub between two adjacent blade platforms about the longitudinal axis of rotation can be formed on either side of a generally substantially cylindrical shape of the hub with a constant radius $R_{nominal}$, each generally spherical cap geometrical shape of each blade platform being defined by a portion of circle with a constant radius $R_{circle}$ with a circle centre located at a constant distance $R_{off}$ from the axis of rotation. The dimensioning parameterisation of the hub can thereby verify the following relationship:

$$\varphi = arcos\left(\frac{R_{nominal}^2 + R_{off}^2 - R_{circle}^2}{2 * R_{nominal} * R_{off}}\right) < \frac{1}{2} * \frac{360}{Z}$$

in which Z represents the number of blade platforms.

Preferentially, the dimensioning parameterisation of the hub can verify the following relationship:

$$\varphi = arcos\left(\frac{R_{nominal}^2 + R_{off}^2 - R_{circle}^2}{2 * R_{nominal} * R_{off}}\right) \leq \frac{1}{3} * \frac{360}{Z}$$

Moreover, the hub can be defined by a reference hub with a cylindrical shape, with a nominal radius, and in a transverse cross-section, the tangent curves at the points of intersection of two adjacent platforms with the nominal radius of the reference hub with a cylindrical shape can respectively be identical to the tangent curves of the circles partly defining the platforms. Advantageously, having identical tangent curves can enable this way the flow disturbances to be restricted as much as possible.

Further, another object of the invention, according to another of its aspects, is a turbomachine, characterised in that it includes at least one propeller hub as previously defined, and at least one propeller comprising a plurality of variable-pitch blades, each mounted to a blade platform of said at least one propeller hub.

The turbomachine can be of any type. In particular, it can be of the unducted fan type, including at least one fan propeller, in particular a propeller or a couple of co-rotating or counter-rotating propellers, the blades of said at least one fan propeller being mounted to the blade platforms of said at least one propeller hub.

The propeller hub and the turbomachine according to the invention can include any of the characteristics previously set out, taken alone or according to any technically possible combinations with other characteristics.

BRIEF DESCRIPTION OF THE DRAWINGS

The invention could be better understood upon reading the detailed description that follows, of a non-limiting implementation example of the same, as well as upon examining the schematic and partial figures, of the appended drawing, in which:

FIG. 1 represents, in a perspective partial cross-section view, an exemplary embodiment of an unducted fan turbomachine provided with a couple of counter-rotating propellers, including two propeller hubs in accordance with the invention, FIG. 2 is an enlarged view of a part of FIG. 1.

Figure 3:
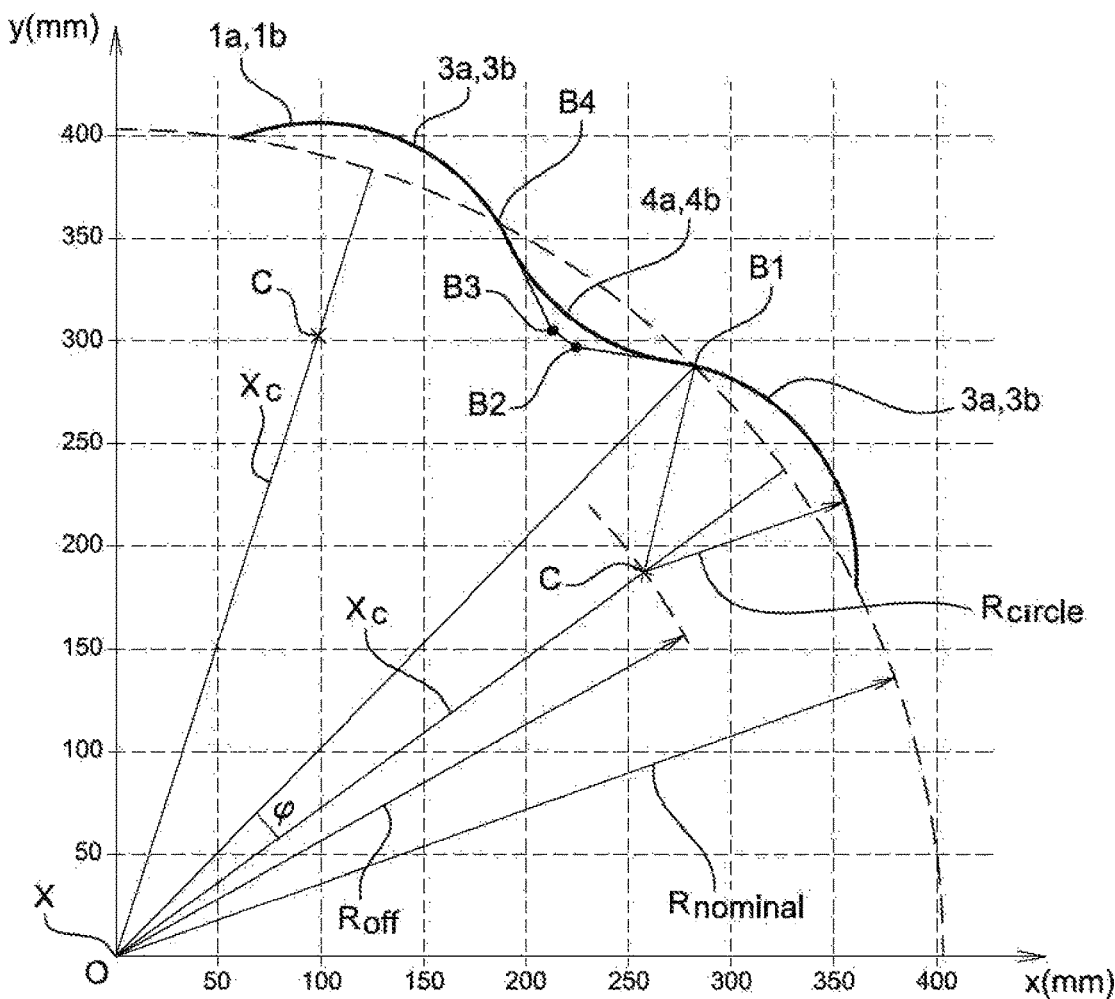
FIG. 3 represents a graph made in the plane of coordinates (x, y), expressed in mm, of rotation of a propeller of the turbomachine of FIG. 1, enabling parameterisation of the blade platforms and of a propeller hub of the turbomachine of FIG. 1 to be illustrated.

Throughout the figures, identical references can designate identical or analogous elements.

In addition, the different parts represented in the figures are not necessary drawn to a uniform scale, to make the figures more readable.

DETAILED DISCLOSURE OF A PARTICULAR EMBODIMENT

Throughout the description, it is noted that the terms upstream and downstream are to be considered with respect to a main normal flow direction F of the gases (from upstream to downstream) for a turbomachine 10. Additionally, the longitudinal axis of rotation X of the turbomachine 10 refers to the radial axis of symmetry of the turbomachine 10. The axial direction of the turbomachine 10 corresponds to the axis of rotation X of the turbomachine 10. A radial direction of the turbomachine 10 is a direction perpendicular to the axis X of the turbomachine 10.

Further, unless otherwise indicated, the adjectives and adverbs axial, radial, axially and radially are used in reference to the abovementioned axial and radial directions. Additionally, unless otherwise indicated, the terms internal and external, or inner and outer, are used in reference to a radial direction such that the internal or inner part of an element is closer to the axis X of the turbomachine 10 than the external or outer part of the same element.

In the example described hereinafter in reference to FIGS. 1 to 4, it is considered in a non-limiting way that the turbomachine 10 is of the unducted fan type, including a couple of variable-pitch counter-rotating propellers.

In FIG. 1, along a perspective partial cross-section view, an exemplary embodiment of such a turbomachine 10 is represented, including two propeller hubs 1a and 1b in accordance with the invention. Additionally, FIG. 2 is an enlarged view of a part of FIG. 1.

The first hub 1a includes a plurality of blade platforms 3a enabling the blade roots to be received from the plurality of blades 2a of the first rotating propeller of the turbomachine 10.

Likewise, the second hub 1b includes a plurality of blade platforms 3b enabling the blade roots to be received from the plurality of blades 2b of the second rotating propeller of the turbomachine 10.

These blade platforms 3a and 3b are evenly distributed respectively at the outer annular perimeter Pa of the hub 1a and the outer annular perimeter Pb of the hub 1b in a concentric way to the longitudinal axis of rotation X of the turbomachine 10.

In accordance with the invention, each blade platform 3a, 3b has a generally spherical cap geometrical shape.

Moreover, between two successive or adjacent blade platforms 3a, 3b about the axis of rotation X, the diameter D of the hub 1a, 1b is axially and radially variable. This way, the hub 1a or 1b has a global outer shape which is no longer cylindrical or conical as in accordance with the conventional embodiments of prior art, but further toroidal.

More precisely, the hub 1a, 1b has, between two adjacent blade platforms 3a, 3b about the longitudinal axis of rotation X, a geometrical relief shape, respectively 4a and 4b, causing an axial and radial variation in the diameter D of the hub 1a, 1b.

In this example, this geometrical relief shape 4a, 4b is substantially related to an arc of circle shape in a transverse cross-section.

Further, also in this example, the generally spherical cap geometrical shape of each blade platform 3a, 3b is substantially convex with respect to the longitudinal axis of rotation X, whereas the geometrical relief shape 4a, 4b of the hub 1a, 1b between two adjacent blade platforms 3a, 3b about the longitudinal axis of rotation X is substantially concave with respect to the longitudinal axis of rotation X, such that each geometrical relief shape 4a, 4b is related to a dug part 4a, 4b. Of course, these concavities can alternatively be reversed with the proviso that they are different.

By virtue of the invention, the use of a spherical shape for the blade platforms 3a, 3b enables a substantial continuity in the geometry between the hub 1a, 1b and the blade platforms 3a, 3b to be achieved, so as to limit disturbances on the flow at the blade roots regardless of the blade pitch. Thus, the aerodynamic performance losses of the turbomachine 10 can be limited regardless of the pitch.

Additionally, making the dug parts 4a, 4b on the perimeter Pa, Pb of the hub 1a, 1b also enables geometrical continuity to be maintained between the blade platforms 3a, 3b, which induce a local increase in the diameter D of the hub 1a, 1b, and the hub 1a, 1b on the entire pitch range and thus the cross-section loss induced by the blade platforms 3a, 3b with a spherical shape to be compensated for. These dug parts 4a, 4b further enable the flow rate between the blade platforms 3a, 3b to be reduced and any blocking problem to be decreased. The dimensioning of the blade platforms 3a, 3b and of the hub 1a, 1b should be made so as to ensure geometrical continuity at these interfaces.

A parameterisation principle of the blade platforms 3a, 3b and of a hub 1a, 1b of the turbomachine 10 of FIG. 1 will now be described in reference to FIGS. 3 and 4. Indeed, a suitable parameterisation of the radius and of the radial positioning of the blade platforms 3a, 3b as a spherical cap can enable the cross-section reduction to be limited, and also a geometrical continuity to be ensured between the hub 1a, 1b and the blade platforms 3a, 3b.

Figure 4:
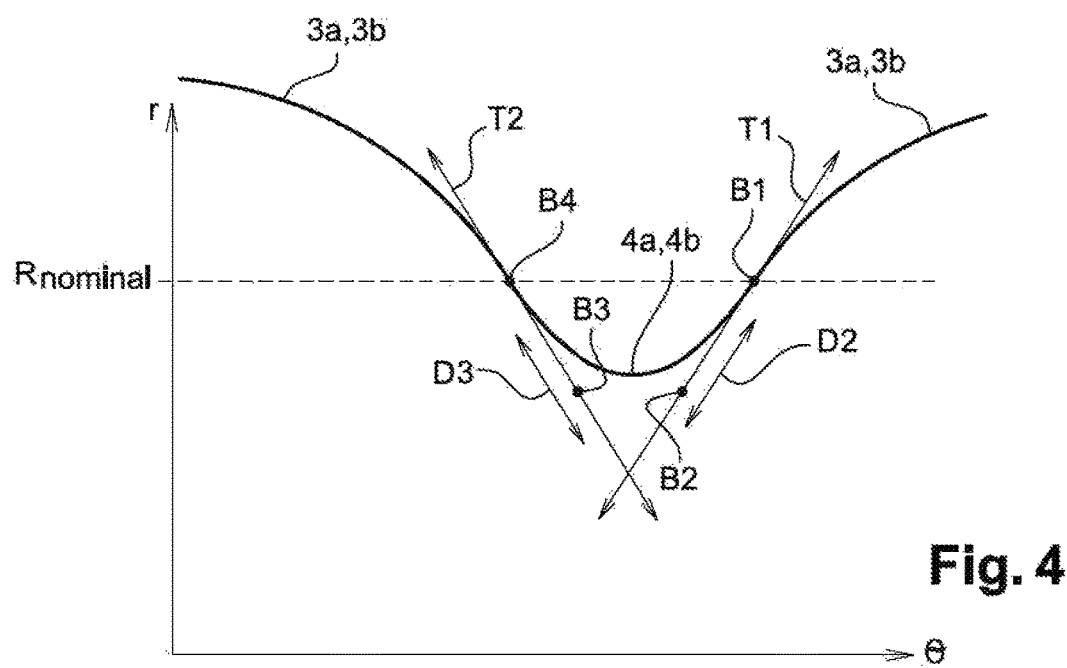
FIG. 4 represents a graph of details with respect to that of FIG. 3, made in a polar frame reference (r, θ), enabling a geometrical relief shape of the hub to be viewed between two geometrical spherical cap shapes of two successive blade platforms.

Thus, FIG. 3 represents a graph made in the plane of coordinates (x, y), expressed in mm, of rotation of a propeller of the turbomachine of FIG. 1, enabling parameterisation of the blade platforms 3a, 3b and of a propeller hub 1a, 1b to be illustrated, and FIG. 4 represents a graph of details with respect to that of FIG. 3, made in a polar reference frame (r, θ), enabling a geometrical relief shape 4a or 4b of the hub 1a or 1b to be viewed between two spherical cap geometrical shapes of two successive blade platforms 3a or 3b.

The parameterisation is thus made in the plane of rotation of the propeller associated with the propeller hub 1a or 1b being considered.

In FIG. 3, the dotted line curve represents the cylindrical shape reference hub, with a radius $R_{nominal}$, corresponding to the hub which would be obtained without implementing the invention. Moreover, the axes Xc represent the pitch change axes for the blades.

In the plane of rotation (x, y) of FIG. 3, the platforms 3a, 3b correspond to portions of circle. These circles are defined by two parameters detailed hereinafter.

Figure 5:
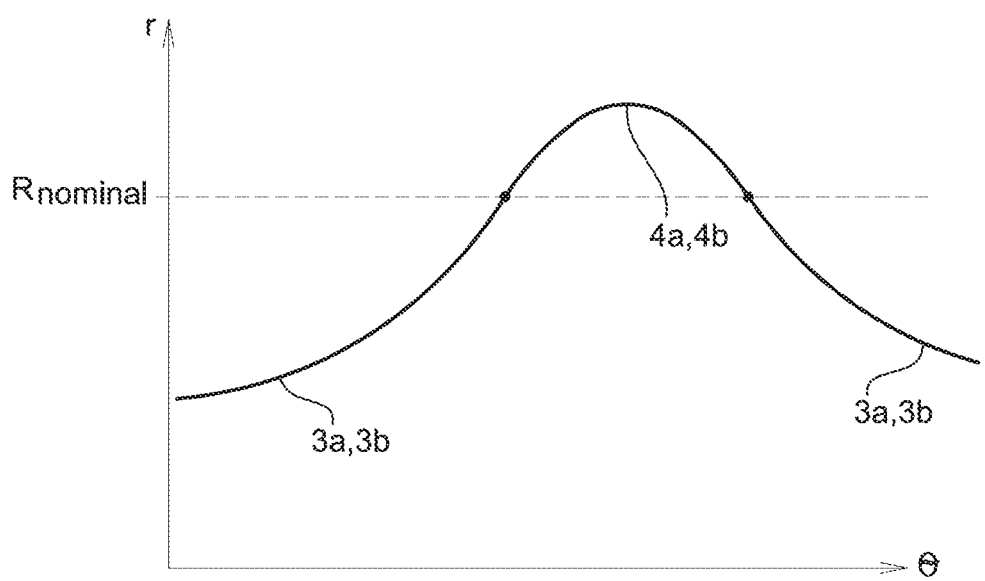
FIG. 5 represents a graph made in the plane of coordinates (x, y), expressed in mm, of rotation of a propeller of another embodiment of a turbomachine, enabling parameterisation of the blade platforms and of a propeller hub of the turbomachine.

On the one hand, this is the circle centre C forming the portion of circle defining the blade platform 3a, 3b. These centres C defining the portions of circle forming the platforms 3a, 3b are respectively located along the pitch change axes Xc of the blades at a radius $R_{off}$ of the centre of rotation O of the blades. This centring radius $R_{off}$ can be lower than the nominal radius $R_{nominal}$ of the cylindrical shape reference hub if it is desired to create convex platforms 3a, 3b, as represented herein in FIG. 3. It can also be higher than the nominal radius $R_{nominal}$ if it is desired to create concave platforms 3a, 3b as shown in FIG. 5.

On the other hand, the platforms 3a, 3b are each defined by a circle having a centre C and a radius $R_{circle}$, as represented in FIG. 3.

This two-parameter parameterisation enables the angular and radial extension of a platform 3a, 3b to be readily managed.

Additionally, the dimensioning of the dug parts 4a, 4b, forming inter-platforms connections, can be of the C1 type, continuous and tangent, with the portions of circle of the platforms 3a, 3b.

The modelling proposed in FIGS. 3 and 4 uses a 4-point Bezier curve. The first B1 and last B4 points are points of intersection of two adjacent platforms 3a or 3b with the nominal radius $R_{nominal}$ of the cylindrical reference hub. The second B2 and third B3 points are defined such that the tangents at these points are identical to the tangents of the circles of the platforms at their connection with the reference hub, as depicted by the tangents T1 and T2 in FIG. 4. The properties of Bezier curves are additionally known to those skilled in the art.

These two points B2 and B3 can be respectively moved along the tangents T1 and T2 through a digging coefficient. The double arrows D2 and D3 thus represent the (possibility of movement of the Bezier point B2, respectively B3, through a digging coefficient.

This parameterisation thereby enables the connection between the platforms that each dug part 4a, 4b forms to be more or less dug. It is thus possible to compensate for the cross-section area loss related to the platforms 3a, 3b or even to increase the flow cross-sectional area between two platforms. This parameterisation is of course applicable to the case of a geometrical relief shape between the platforms 3a, 3b forming an inter-platform connection with a convex form.

Additionally, for construction reasons, and in reference to FIG. 3, the angle φ of the triangle OCB1 represented verifies the relationship $$\varphi < \frac{1}{2} * \frac{360}{z},$$

in which Z represents the number of blade platforms 3a, 3b.

Furthermore, this angle φ can be calculated by the following relationship:

$$\varphi = arcos\left(\frac{R_{nominal}^2 + R_{off}^2 - R_{circle}^2}{2 * R_{nominal} * R_{off}}\right)$$

Thus, for a given value of the nominal radius $R_{nominal}$, the relationship above restrains the couple formed by the radiuses $R_{off}$ and $R_{circle}$.

In this case, a dug part 4a, 4b could be created but, because of a very low angular range, it is nearly impossible to restore the cross-section area loss caused by the platforms 3a, 3b. Thus, advantageously, the angle φ verifies the following relationship $$\varphi < \frac{1}{3} * \frac{360}{z}.$$

Further, each dug part 4a, 4b is preferentially parameterised to allow a cross-section area variation between 0% and 120% of the cross-section area of a blade platform 3a, 3b.

Of course, the invention is not limited to the exemplary embodiment just described. Various modifications can be provided thereto by those skilled in the art.

It is further to be noted that the invention finds applications both for radial pitch propeller blades and for non-radial pitch propeller blades.

The invention claimed is:

1. A hub for a propeller with variable-pitch blades for a turbomachine having a longitudinal axis of rotation, the hub comprising: a plurality of blade platforms, each for receiving a blade root, distributed at an outer annular perimeter of the hub in a concentric way to the longitudinal axis of rotation, wherein each blade platform has a generally spherical cap geometrical shape, wherein the hub has, between two adjacent blade platforms about the longitudinal axis of rotation, a geometrical relief shape causing an axial and radial variation in a diameter of the hub, and wherein the geometrical relief shape of the hub between two adjacent blade platforms about the longitudinal axis of rotation presents an arc of circle shape in a transverse cross-section perpendicular to the longitudinal axis of rotation.

2. The hub according to claim 1, wherein a concavity of the generally spherical cap geometrical shape of each blade platform is reverse to a concavity of the geometrical relief shape of the hub between two adjacent blade platforms about the longitudinal axis of rotation.

3. The hub according to claim 1, wherein the generally spherical cap geometrical shape of each blade platform is convex, and wherein the geometrical relief shape of the hub between two adjacent blade platforms about the longitudinal axis of rotation is concave.

4. The hub according to claim 1, wherein the generally spherical cap geometrical shape of each blade platform is concave, and wherein the geometrical relief shape of the hub between two adjacent blade platforms about the longitudinal axis of rotation is convex.

5. The hub according to claim 2, wherein reverse concavities of the generally spherical cap geometrical shapes of each blade platform and of the geometrical relief shapes of the hub between two adjacent blade platforms about the longitudinal axis of rotation are formed on either side of a generally substantially cylindrical shape of the hub with a constant radius, each generally spherical cap geometrical shape of each blade platform being defined by a portion of circle with a constant radius with a circle center located at a constant distance from the axis of rotation, and wherein the dimensioning parameterisation of the hub verifies the following relationship:

$$arcos\left(\frac{R_{nominal}^2 + R_{off}^2 - R_{circle}^2}{2 * R_{nominal} * R_{off}}\right) < \frac{1}{2} * \frac{360}{Z}$$

wherein $R_{nominal}$ represents the constant radius of the hub with the generally substantially cylindrical shape, $R_{off}$ represents the constant distance, $R_{circle}$ represents the constant radius of the portion of circle, and Z represents the number of blade platforms.

6. The hub according to claim 5, wherein the dimensioning parameterisation of the hub verifies the following relationship:

$$arcos\left(\frac{R_{nominal}^2 + R_{off}^2 - R_{circle}^2}{2 * R_{nominal} * R_{off}}\right) \leq \frac{1}{3} * \frac{360}{Z}.$$

7. The hub according to claim 1, wherein the hub is defined by a reference hub with a cylindrical shape, with a nominal radius, and wherein, in the transverse cross-section perpendicular to the longitudinal axis of rotation, tangent curves at the points of intersection of two adjacent platforms with the nominal radius of the reference hub with a cylindrical shape are respectively identical to the tangent curves of circles partly defining the platforms.

8. A turbomachine comprising at least one propeller hub according to claim 1, and at least one propeller comprising a plurality of variable-pitch blades, each mounted to a blade platform of said at least one propeller hub.

9. The turbomachine according to claim 8, wherein turbomachine is an unducted fan type turbomachine, comprising at least one fan propeller, the blades of said at least one fan propeller being mounted to the blade platforms of said at least one propeller hub.

* * * * *